United States Patent
Lee et al.

(10) Patent No.: US 8,483,127 B2
(45) Date of Patent: Jul. 9, 2013

(54) METHOD FOR CONSTRUCTING DATA FORMAT IN MOBILE COMMUNICATION AND TERMINAL THEREOF

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 12/522,699

(22) PCT Filed: Jan. 8, 2008

(86) PCT No.: PCT/KR2008/000099
§ 371 (c)(1),
(2), (4) Date: Jul. 9, 2009

(87) PCT Pub. No.: WO2008/084955
PCT Pub. Date: Jul. 17, 2008

(65) Prior Publication Data
US 2009/0310538 A1     Dec. 17, 2009

Related U.S. Application Data

(60) Provisional application No. 60/884,401, filed on Jan. 10, 2007, provisional application No. 60/888,508, filed on Feb. 6, 2007.

(51) Int. Cl.
*H04W 4/00*     (2009.01)
*H04W 24/00*    (2009.01)
*H04B 7/00*     (2006.01)

(52) U.S. Cl.
USPC ......... 370/328; 455/422.1; 455/423; 370/310

(58) Field of Classification Search
USPC ............................................... 370/328
See application file for complete search history.

(56) References Cited

U.S. PATENT DOCUMENTS

| 6,665,313 | B1 | 12/2003 | Chang et al. |
| 6,697,347 | B2 | 2/2004 | Ostman et al. |

(Continued)

FOREIGN PATENT DOCUMENTS

| CN | 1595362 | 3/2005 |
| CN | 1805594 | 7/2006 |

(Continued)

OTHER PUBLICATIONS

3rd Generation Partnership Project (3GPP), "Universal Mobile Telecommunications System (UMTS); User Equipment (UE) Procedures in Idle Mode and Procedures for Cell Reselection in Connected Mode (Release 7)," ETSI TS 125 304, v7.1.0, Dec. 2006, XP-014039981.

(Continued)

*Primary Examiner* — Shripal Khajuria
(74) *Attorney, Agent, or Firm* — Lee, Hong, Degerman, Kang & Waimey

(57) ABSTRACT

A method for transmitting downlink data to a mobile terminal is disclosed. The mobile terminal receives a particular common H-RNTI (HS-DSCH Radio Network Identifier) via an HS-SCCH (High Speed-Shared Control Channel) associated with an HS-DSCH (High Speed-Downlink Shared Channel), recognizes whether a header of a MAC (Medium Access Control) PDU (Packet Data Unit) transmitted by the HS-DSCH includes a terminal-exclusive identifier, acquires the terminal-exclusive identifier, and processes the MAC PDU as its own if the acquired terminal-exclusive identifier is intended for the terminal itself.

3 Claims, 15 Drawing Sheets

U.S. PATENT DOCUMENTS

| | | | |
|---|---|---|---|
| 7,006,464 B1 | 2/2006 | Gopalakrishnan et al. | |
| 7,054,288 B2 | 5/2006 | Sternberg et al. | |
| 7,158,504 B2 | 1/2007 | Kadaba et al. | |
| 7,295,573 B2 | 11/2007 | Yi et al. | |
| 7,593,694 B2 | 9/2009 | Michel et al. | |
| 7,623,483 B2 * | 11/2009 | Yi et al. | 370/328 |
| 7,639,644 B2 | 12/2009 | Sternberg et al. | |
| 7,650,559 B2 | 1/2010 | Nishibayashi et al. | |
| 7,743,310 B2 | 6/2010 | Nishibayashi et al. | |
| 7,764,661 B2 | 7/2010 | Heo et al. | |
| 7,801,563 B2 | 9/2010 | Hara et al. | |
| 7,844,884 B2 | 11/2010 | Roh et al. | |
| 7,912,471 B2 | 3/2011 | Kodikara Patabandi et al. | |
| 8,054,786 B2 | 11/2011 | Wu et al. | |
| 8,054,788 B2 | 11/2011 | Ma et al. | |
| 8,059,681 B2 | 11/2011 | Kim et al. | |
| 8,090,390 B2 | 1/2012 | Lee et al. | |
| 8,208,492 B2 | 6/2012 | Kim et al. | |
| 2002/0174276 A1 | 11/2002 | Jiang | |
| 2003/0095519 A1 | 5/2003 | Kuo et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2005/0207343 A1 | 9/2005 | Han | |
| 2005/0250506 A1 * | 11/2005 | Beale et al. | 455/452.1 |
| 2006/0018294 A1 | 1/2006 | Kynaslahti et al. | |
| 2006/0092911 A1 | 5/2006 | Hwang et al. | |
| 2006/0148411 A1 | 7/2006 | Cho et al. | |
| 2006/0152083 A1 | 7/2006 | Fuhr et al. | |
| 2006/0251105 A1 | 11/2006 | Kim et al. | |
| 2007/0014229 A1 * | 1/2007 | Hepler et al. | 370/208 |
| 2007/0047452 A1 | 3/2007 | Lohr et al. | |
| 2007/0091810 A1 | 4/2007 | Kim et al. | |
| 2007/0254679 A1 | 11/2007 | Montojo et al. | |
| 2008/0045272 A1 | 2/2008 | Wang et al. | |
| 2008/0084844 A1 | 4/2008 | Reznik et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0028123 A1 | 1/2009 | Terry et al. | |
| 2009/0262648 A1 | 10/2009 | Chun et al. | |
| 2009/0264164 A1 | 10/2009 | Chun et al. | |
| 2009/0268676 A1 | 10/2009 | Wigard et al. | |
| 2010/0002638 A1 | 1/2010 | Park et al. | |
| 2010/0014446 A1 | 1/2010 | Chun et al. | |
| 2010/0020712 A1 | 1/2010 | Lee et al. | |
| 2010/0034153 A1 | 2/2010 | Lee et al. | |
| 2010/0040002 A1 | 2/2010 | Lee et al. | |
| 2010/0091721 A1 | 4/2010 | Larmo et al. | |
| 2010/0142456 A1 | 6/2010 | Lee et al. | |
| 2010/0172250 A1 | 7/2010 | Chun et al. | |
| 2011/0190001 A1 | 8/2011 | Kodikara Patabandi et al. | |

FOREIGN PATENT DOCUMENTS

| | | |
|---|---|---|
| CN | 1805596 | 7/2006 |
| EP | 1432261 | 6/2004 |
| EP | 1724948 | 11/2006 |
| EP | 1755355 | 2/2007 |
| EP | 1843504 | 10/2007 |
| EP | 1845649 | 10/2007 |
| EP | 1845650 | 10/2007 |
| JP | 2002247042 | 8/2002 |
| JP | 2002527945 | 8/2002 |
| JP | 2002290413 | 10/2002 |
| JP | 2003304574 | 10/2003 |
| JP | 2006148490 | 6/2006 |
| JP | 2006237897 | 9/2006 |
| JP | 2006352708 A | 12/2006 |
| JP | 2007-533276 | 11/2007 |
| JP | 2009535957 | 10/2009 |
| KR | 10-2002-0014939 | 2/2002 |
| KR | 1020020061512 | 7/2002 |
| RU | 2280327 | 7/2006 |
| WO | 97/11566 | 3/1997 |
| WO | 98/24250 | 6/1998 |
| WO | 02093296 | 11/2002 |
| WO | 03085874 | 10/2003 |
| WO | 03/096149 | 11/2003 |
| WO | 03/096567 | 11/2003 |
| WO | 2005/119941 | 12/2005 |
| WO | 2005125252 | 12/2005 |
| WO | 2006022876 | 3/2006 |
| WO | 2006105333 | 10/2006 |
| WO | 2006/118418 | 11/2006 |

OTHER PUBLICATIONS

3rd Generation Partnership Project (3GPP), "Universal Mobile Telecommunications System (UMTS); High Speed Downlink Packet Access (HSDPA); Overall Description; Stage 2 (Release 7)," ETSI TS 125 308, v7.1.0, Dec. 2006, XP-014039997.

Nokia; "ARQ Operation With HARQ-ARQ Interaction"; 3GPP TSG-RAN WG2, R2-062765, Oct. 9, 2006; XP003012349.

Ericsson; "Uplink HARQ-ARQ Interactions for NACK -> ACK Error", 3GPP TSG-RAN WG2, R2-063238, Nov. 6, 2006; XP050132733.

Samsung; "MAC Functions: ARQ"; 3GPP TSG-RAN WG2, R2-060374, Feb. 13, 2006; XP002488423.

Herrmann, C. et al.; "Improving Packet Loss Probability in the UMTS High-Speed Downlink"; IEEE Vehicular Technology Conference, VTC 2003 Fall, Oct. 6, 2003, pp. 2655-2659; XP010701537.

Samsung; "DL Control Channel Structure: Overview"; 3GPP TSG-RAN WG1, R1-062534, Oct. 9, 2006.

Ericsson; "E-UTRA Downlink Control Signaling—Open Issues", 3GPP TSG-RAN WG1, R1-061365, May 8, 2006; XP050102238.

Rapporteur (Motorola); "Report of E-Mail Discussion: DL Scheduling"; 3GPP TSG-RAN WG1, R1-063684, Dec. 12, 2006; XP050133082.

LG Electronics; "Downlink Control Signaling" 3GPP TSG-RAN WG1, R1-063177, Nov. 6, 2006; XP050103632.

Texas Instruments; "Control Channel Structure and Coding in E-Utra Downlink" 3GPP TSG-RAN WG1, R1-063220; Nov. 6, 2006; XP050103675.

Sharp; "UE Identity in L1/L2 Control Signaling for Downlink Scheduling Resource Allocation", 3GPP TSG-RAN WG2, R2-061129, May 8, 2006; XP050131084.

Nokia, "Further discussion on delay enhancements in Rel7", R2-061189, 3GPP TSG-RAN WG2 Meeting #53, May 2006.

Korean Intellectual Property Office Application Serial No. 10-2007-0002807, Office Action dated Apr. 12, 2013, 4 pages.

* cited by examiner

METHOD FOR CONSTRUCTING DATA FORMAT IN MOBILE COMMUNICATION AND TERMINAL THEREOF

CROSS-REFERENCE TO RELATED APPLICATIONS

This application is the National Stage filing under 35 U.S.C. §371 of International Application No. PCT/KR2008/000099, filed on Jan. 8, 2008, which claims the benefit of U.S. Provisional Application Ser. Nos. 60/884,401, filed on Jan. 10, 2007, and 60/888,508, filed on Feb. 6, 2007.

TECHNICAL FIELD

The present invention relates to a method for transmitting downlink data to a mobile terminal in mobile communications, and more particularly, to a method for constructing a data format for mobile communication and a terminal implementing such method.

BACKGROUND ART

FIG. 1 illustrates an exemplary basic structure of a UMTS (Universal Mobile Telecommunications System) network according to the present invention and the related art. The UMTS includes a terminal (user equipment (UE)), a UTRAN (UMTS Terrestrial Radio Access Network), and a core network (CN). The UTRAN includes one or more radio network sub-systems (RNSs). Each RNS includes a radio network controller (RNC) and a plurality of base stations (Node-Bs) managed by the RNC. One or more cells exist for a single Node B.

FIG. 2 illustrates a radio interface protocol architecture based on a 3GPP radio access network specification between the UE and the UTRAN. As shown in FIG. 2, the radio interface protocol has horizontal layers comprising a physical layer, a data link layer, and a network layer, and has vertical planes comprising a user plane (U-plane) for transmitting data information and a control plane (C-plane) for transmitting control signals (signaling). The protocol layers in FIG. 2 can be divided into a first layer (L1), a second layer (L2), and a third layer (L3) based on three lower layers of an open system interconnection (OSI) standard model widely known in communication systems.

Each layer in FIG. 2 will be described in more detail as follows. The first layer (L1), namely, the physical layer, provides an information transfer service to an upper layer by using a physical channel. The physical layer is connected to an upper layer called a medium access control (MAC) layer via a transport channel. Data is transferred between the MAC layer and the physical layer via the transport channel. Meanwhile, between different physical layers, namely, between a physical layer of a transmitting side and that of a receiving side, data is transferred via the physical channel.

The MAC layer of the second layer provides a service to a radio link control (RLC) layer, its upper layer, via a logical channel. The RLC layer of the second layer may support reliable data transmissions and perform segmentation and concatenation on RLC service data units (SDUs) delivered from an upper layer.

A radio resource control (RRC) layer located at the lowest portion of the third layer is defined only in the control plane, and handles the controlling of transport channels and physical channels in relation to establishment, reconfiguration and release of radio bearers (RBs). The radio bearer refers to a service provided by the second layer (L2) for data transmission between the terminal and the UTRAN. In general, establishing the radio bearer refers to defining the protocol layers and the characteristics of the channels required for providing a specific service, and setting respective substantial parameters and operation methods.

When an RRC layer of a particular terminal and that of the UTRAN are connected to exchange an RRC message to each other, the corresponding terminal is in an RRC connected state, and when the RRC layer of the particular terminal and that of the UTRAN are not connected, the corresponding terminal is in an idle state. The RRC connected state of the terminal may be divided into a URA_PCH state, a CELL_PCH state, a CELL_FACH state, and a CELL_DCH state. In order to reduce power consumption, terminals in the idle state, in the URA_PCH or in the CELL_PCH state discontinuously receive a PICH (Paging indicator Channel), a physical channel, and an SCCPCH (Secondary Common Control Physical Channel), a physical channel, to which a PCH (Paging Channel), a transport channel, is mapped, by using a DRX (Discontinuous Reception) method. During other time intervals than the time duration while the PICH or the SCCPCH is received, the terminal is in a sleeping mode. In the related art, the terminal performing the DRX method wakes up at every CN domain specific DRX cycle length or at every UTRAN specific DRX cycle length to receive a terminal-exclusive PI (Paging Indicator). Here, the terminal-exclusive PI in the related art is used to inform a particular terminal that a paging message will be transmitted to the particular terminal via the PCH channel. The PICH channel is divided into 10 ms-long PICH frames, and a single PICH frame consists of 300 bits. The first 288 bits of a single frame are used for the terminal-exclusive PICH to transmit one or more terminal-exclusive PIs. The rear 12 bits of the single PICH frame are not transmitted. For the sake of convenience, the portion of the front 288 bits of the PICH channel is defined as a UE PICH, and the portion of the rear 12 bits is defined as a PICH unused part.

FIG. 3 is a signal flow chart illustrating an RRC connection procedure between the terminal and the UTRAN according to the related art. As shown in FIG. 3, in order for the terminal in the idle state to be RRC-connected with the UTRAN, the terminal should perform an RRC connection procedure. The RRC connection procedure may include three steps: transmitting, by the terminal, an RRC connection request message to the UTRAN (S1); transmitting, by the UTRAN, an RRC connection setup message to the terminal (S2); and transmitting, by the terminal, an RRC connection setup complete message to the UTRAN (S3).

An HS-DSCH transmission for transmitting high speed data to a single terminal via the downlink in the related art will now be described. The HS-DSCH has a 2 ms transmission time interval (TTI) (3 slots) and supports various modulation code sets (MCSs) to obtain a high data rate. An optimum throughput may be achieved by selecting an MCS which is most suitable for a channel situation. For this, a hybrid automatic repeat request (HARQ) technique that combines an ARQ technique and a channel coding technique can be employed to perform reliable transmissions.

FIG. 4 illustrates a protocol stack of the HS-DSCH according to the related art. As shown in FIG. 4, a data unit transferred from an RLC layer of an SRNC is delivered to a MAC-d entity that manages a dedicated channel via a DICH or a DCCH, a logical channel, and the corresponding data is transferred to a MAC-hs of a Node B via a MAC-c/sh/m of an CRNC. Here, the MAC-d is a MAC entity that manages the dedicated channel, the MAC-c/sh/m is a MAC entity that manages a common channel, and a MAC-hs is a MAC entity that manages the HS-DSCH.

A physical channel HS-PDSCH is used to transmit the transport channel HS-DSCH. The HS-PDSCH has a fixed 16 spreading factor and corresponds to a channelization code selected from a set of channelization codes reserved for HS-DSCH data transmission. If a multi-code transmission is performed with respect to a single UE, a plurality of channelization codes are allocated during the same HS-PDSCH sub-frame. FIG. 5 illustrates a sub-frame and slot structure of the HS-PDSCH. The HS-PDSCH transmits QPSK or 16 QAM modulation symbols. In FIG. 5, 'M' indicates the number of bits per modulation symbol. Namely, in case of QPSK, 'M' is 2, and in case of 16QAM, 'M' is 4.

FIG. 6 illustrates a channel configuration according to the related art.

As shown in FIG. 6, in order to transmit user data via the HS-DSCH, HS-DSCH control information needs to be transmitted, and in this case, the HS-DSCH control information is transmitted via a downlink HS-SCCH (High Speed-Shared Control Channel) and an uplink HS-DPCCH (High Speed-Dedicated Physical Control Channel). Here, a DPCH (Dedicated Physical Channel) is a bi-directional physical channel, to which the transport channel DCH is mapped, and is used to transfer terminal-exclusive data and terminal-exclusive L1 control information such as a power control signal required for controlling closed-loop power. In addition, an F-DPCH (Fractional Dedicated Physical Channel), a downlink channel, is a physical channel that transmits several DPCHs by using a single channel code. Here, a single F-DPCH does not transmit terminal-exclusive (or terminal dedicated) data of several terminals but is used to transfer terminal-exclusive L1 control information of several terminals, such as the power control signal required for controlling the closed-loop power, together. If there is a downlink F-DPCH channel, an uplink DPCH channel also operates in conjunction. In FIG. 6, a UE1, a UE2 and a UE3 use the F-DCPH via a single channel code and, in this case, each terminal provides the DPCH upwardly.

The downlink HS-SCCH, a downlink physical channel, is transmitted with a spreading factor 128 and has a 60-kbps transfer rate. FIG. 7 illustrates a sub-frame structure of the HS-SCCH. Information transmitted via the downlink HS-SCCH may be roughly divided into transport format and resource related information (TFRI) and HARQ-related information, and in addition, UE identifier (namely, an H-RNTI (HS-DSCH Radio Network Temporary Identifier)) information for providing information about a particular user is masked thereto and then transmitted. Table 1 shows detailed HS-SCCH information.

TABLE 1

| TFRI information | |
|---|---|
| Channelization-code-set information (7 bits) | xccs, 1, xccs, 2 ... Xccs, 7 |
| Modulation scheme information (1 bit) | xms, 1 |
| Transport-block size information (6 bits) | Xtbs, 1, xtbs, 2 ... Xtbs, 6 |
| HARQ information | |
| Hybrid-ARQ process information (3 bits) | xhap, 1, xhap, 2, xhap, 3 |
| Redundancy and constellation version (3 bits) | xrv, 1, xrv, 2, xrv, 3 |
| New data indicator (1 bit) | xnd, 1 |
| UE ID information | |
| UE identity (16 bits) | xue, 1, xue, 2, ... xue, 16 |

FIG. 8 shows a coding scheme of the HS-SCCH based on the above information.

The uplink HS-DPCCH transmits an uplink feedback signaling related to downlink HS-DSCH data transmission. The HS-DPCCH, a dedicated channel for a particular terminal, operates cooperatively with the uplink and downlink DPCHs. The feedback signaling includes ACK (Acknowledgement)/NACK (Negative Acknowledgement) information for the HARQ and a CQI (Channel Quality Indicator). A frame of the HS-DPCCH includes five sub-frames. Each sub-frame has a length of 2 ms, and a single sub-frame includes the first to third slots, namely, the three slots. Each slot of the sub-frames carries the following information: HARQ ACK/NACK information is carried in the first slot of the sub-frames of the HS-DPCCH; and the CQI is carried in the second and third slots of the sub-frames of the HS-DSCH. The HS-DPCCH is transmitted always together with an uplink PDCCH. The CQI transfers status information of a downlink radio channel obtained from the results of the UE's measurement of a downlink CPICH (Common Pilot Channel), and the ACK/NACK provides ACK or NACK information regarding a user data packet which has been transmitted via the downlink HS-DSCH according to the HARQ mechanism. FIG. 9 illustrates a frame structure of the uplink HS-DPCCH.

In the related art, when the HS-DSCH is transmitted to a particular terminal, the HS-SCCH indicates a terminal-exclusive H-RNTI (HS-DSCH Radio Network Temporary Identifier). Meanwhile, if the HS-DSCH is transmitted to several terminals, the HS-SCCH indicates a common H-RNTI. In addition, in the related art, the MAC PDU of the HS-DSCH does not include a terminal identifier (UE identifier, or UE identity).

In the related art, in a particular case, the radio network may transmit the HS-DSCH to a particular terminal that has not been allocated a terminal-exclusive H-RNTI. In this case, because the particular terminal does not have a terminal-exclusive H-RNTI, the radio network informs the particular terminal about the transmission of the HS-DSCH via the common H-RNTI. Then, the particular terminal cannot determine that the HS-DSCH transmission was intended for itself, which is problematic.

TECHNICAL GIST OF THE PRESENT INVENTION

Therefore, it is an object of the present invention to allow a particular terminal, which has not been allocated a terminal-exclusive H-RNTI, to receive data via a shared data channel such as an HS-DSCH by using a newly defined MAC PDU format when the HS-DSCH is transmitted by using a common H-RNTI.

To achieve the above object, there is provided a method for transmitting downlink data between a radio network and a terminal in mobile communication, including: (A) receiving, by a terminal, a common identifier via a control channel associated with a shared data channel; (B) checking whether a terminal-exclusive identifier is included in a header of a MAC (Medium Access Control) PDU (Packet Data Unit) transmitted by the shared data channel; (C) acquiring a terminal-exclusive identifier if the header of the MAC PDU includes the terminal-exclusive identifier, and checking whether the acquired terminal-exclusive identifier and a terminal-exclusive identifier stored in the terminal are identical; and (D) processing the MAC PDU if the terminal-exclusive identifiers are identical.

Preferably, the shared data channel is an HS-DSCH (High Speed-Dedicated Shared Channel), and the control channel is an HS-SCCH (High Speed-Shared Control Channel).

Preferably, the common identifier is an H-RNTI.

Preferably, the terminal-exclusive identifier included in the header of the MAC PDU is a U-RNTI (UTRAN Radio Network Temporary Identity) that indicates a particular terminal within a UTRAN.

Preferably, in step (D), if the terminal-exclusive identifiers are not identical, the MAC PDU is discarded.

To achieve the above object, there is also provided a terminal including: a receiving unit that receives a particular common identifier via a control channel associated with a shared data channel in a radio network; and a processing unit that checks whether a header of a MAC PDU transmitted by the shard data channel includes a terminal-exclusive identifier, acquires a terminal-exclusive identifier of the header of the MAC PDU if the identifier is included in the header, compares the acquired terminal-exclusive identifier with a terminal-exclusive identifier stored in the terminal to determine whether they are identical, and transfers the MAC PDU (corresponding MAC SDU) to a upper MAC layer if the terminal-exclusive identifiers are identical.

Preferably, if the acquired terminal-exclusive identifier is not identical to that stored in the terminal, the processing unit processes such that the received MAC PDU is discarded.

Preferably, the processing unit determines a format of the MAC PDU used for transmitting the shared data channel indicated by the control channel and decapsulates (splits) the received MAC PDU according to the determined MAC PDU format.

Preferably, the shared data channel refers to an HS-DSCH (High Speed-Dedicated Shared Channel) and the control channel refers to an HS-SCCH (High Speed-Shared Control Channel).

Preferably, the terminal-exclusive identifier included in the header of the MAC PDU is a U-RNTI that indicates a particular terminal within a UTRAN.

According to the present invention, the mobile terminal can receive a particular common H-RNTI via the HS-SCCH associated with the HS-DSCH and recognize whether or not a header of a MAC PDU transmitted by the HS-DSCH includes a terminal-exclusive identifier, acquire the terminal-exclusive identifier. If the terminal-exclusive identifier is intended for itself, the mobile terminal can process the MAC PDU as its own, whereby even if a common H-RNTI is indicated, the particular terminal can receive the HS-DSCH.

MODE FOR CARRYING OUT THE PREFERRED EMBODIMENTS

The present invention is applied for a UMTS communication system, communication device and communication method that can transmit downlink data to a mobile terminal. However, the present invention is not limited as such, and may be applicable to any wired/wireless communication technique.

The basic concept of the present invention provides a method in which only a particular terminal can receive data via a shared data channel (e.g., an HS-DSCH) when a common terminal identifier (e.g., a common H-RNTI) is used. In addition, the present invention provides a new format of a MAC PDU that can perform such method. Namely, a mobile terminal 1) receives a particular common identifier (e.g., the H-RNTI) via a control channel (e.g., an HS-SCCH) associated with the shared data channel, 2) checks whether a header of a MAC PDU transmitted by the shared data channel includes a terminal-exclusive identifier (e.g., a U-RNTI), and 3) if the header includes a terminal-exclusive identifier, the mobile terminal acquires the terminal-exclusive identifier, and if the terminal-exclusive identifier is intended for the mobile terminal itself, the mobile terminal processes the MAC PDU as its own.

In the present invention, a format of a MAC PDU used for transmission of an HS-DSCH indicated by the HS-SCCH is determined according to the H-RNTI, the terminal identifier, received via the HS-SCCH. Namely, if the terminal identifier is different, the MAC PDU may be different. In other words, depending on whether the H-RNTI is terminal-exclusive or common, a transmitting side (network) transmits a different MAC DPU format. A receiving side (terminal) checks whether it is a terminal-exclusive H-RNTI or a common H-RNTI and decodes the MAC PDU according to the corresponding format.

The terminal receives the HS-SCCH and acquires the terminal identifier H-RNTI, determines the format of the MAC DPU received via the HS-DSCH according to the acquired H-RNTI, and decapsulates the received MAC PDU according to the determined MAC PDU.

The embodiments of the present invention will now be described with reference to FIGS. 11 to 13.

Figure 1:
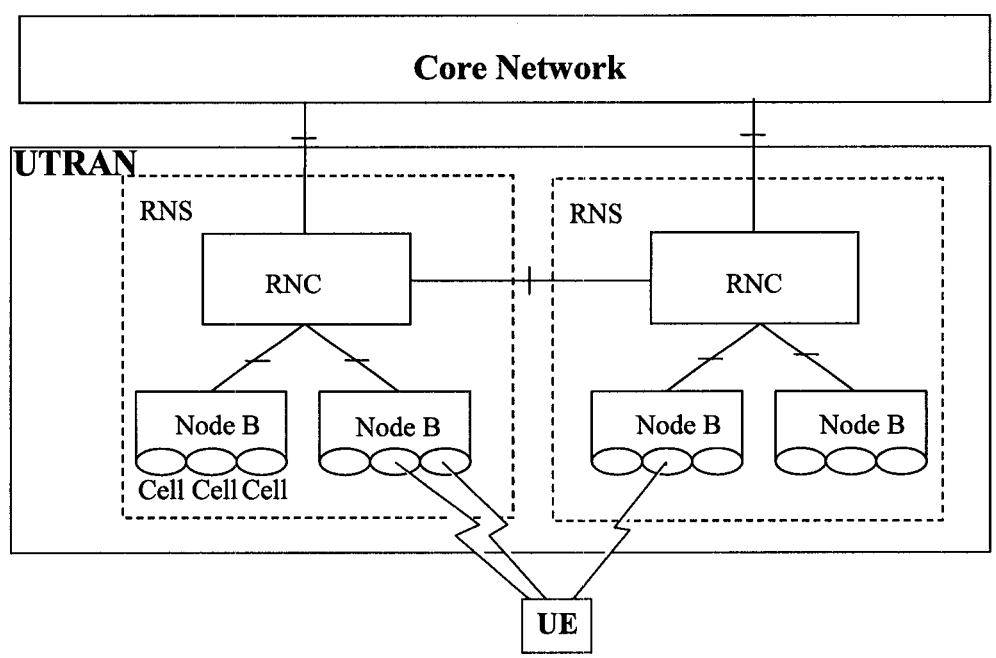
FIG. 1 illustrates an exemplary basic structure of a UMTS network according to the present invention and the related art.
Figure 2:
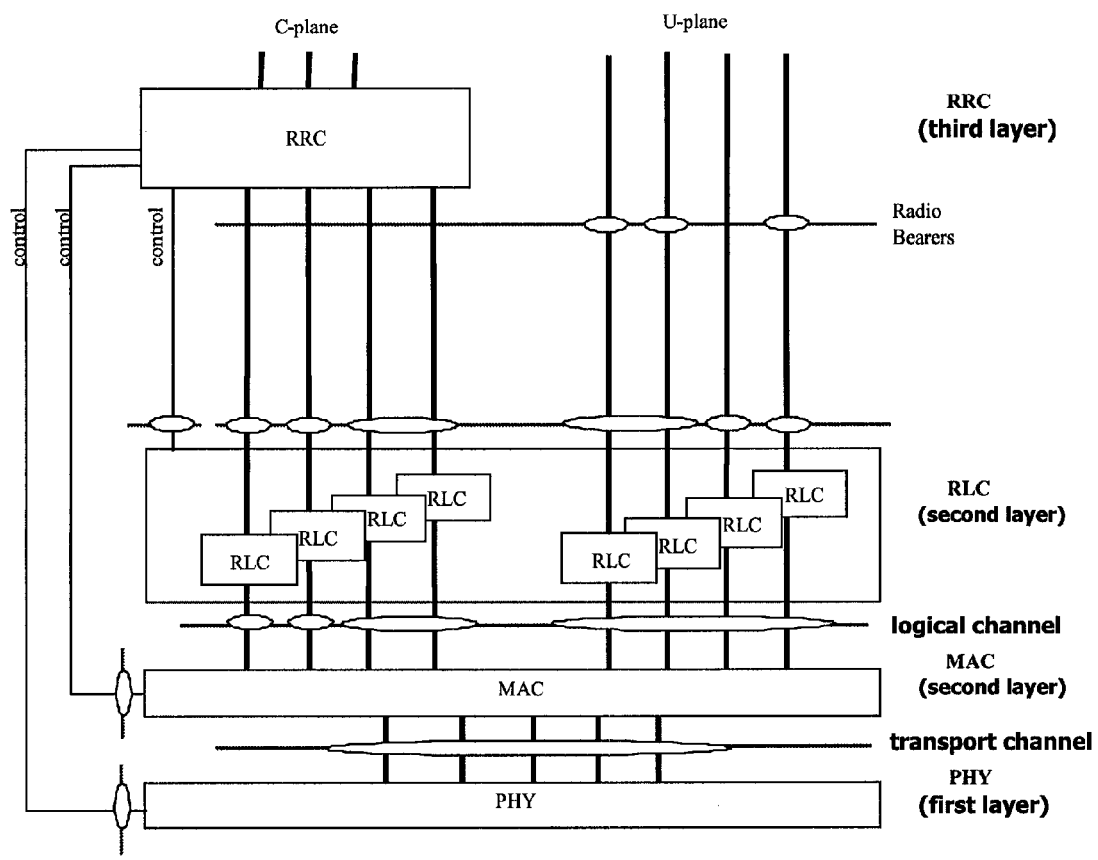
FIG. 2 illustrates a radio interface protocol architecture based on a 3GPP radio access network specification between a terminal and a UTRAN.
Figure 3:
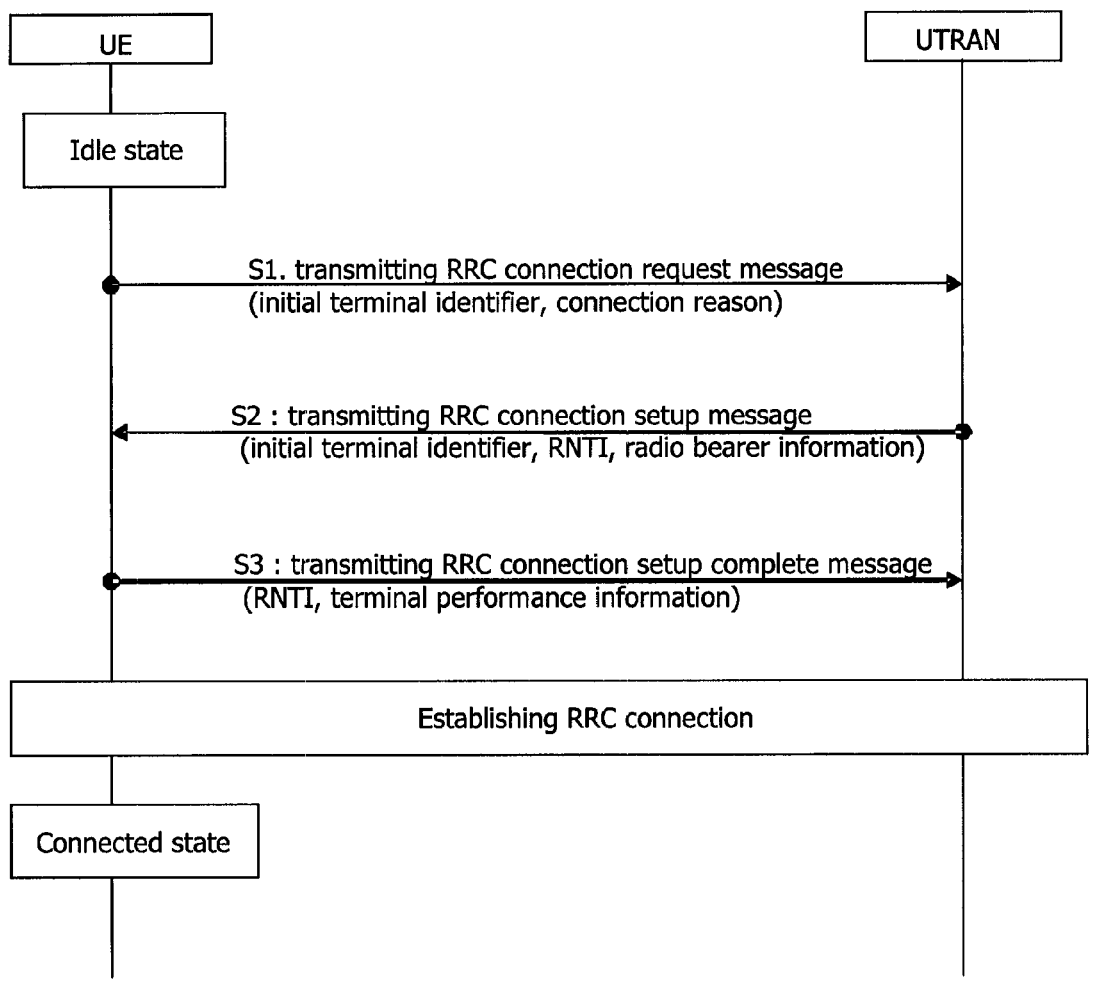
FIG. 3 is a signal flow chart illustrating an RRC connection procedure between the terminal and the UTRAN according to the related art.
Figure 4:
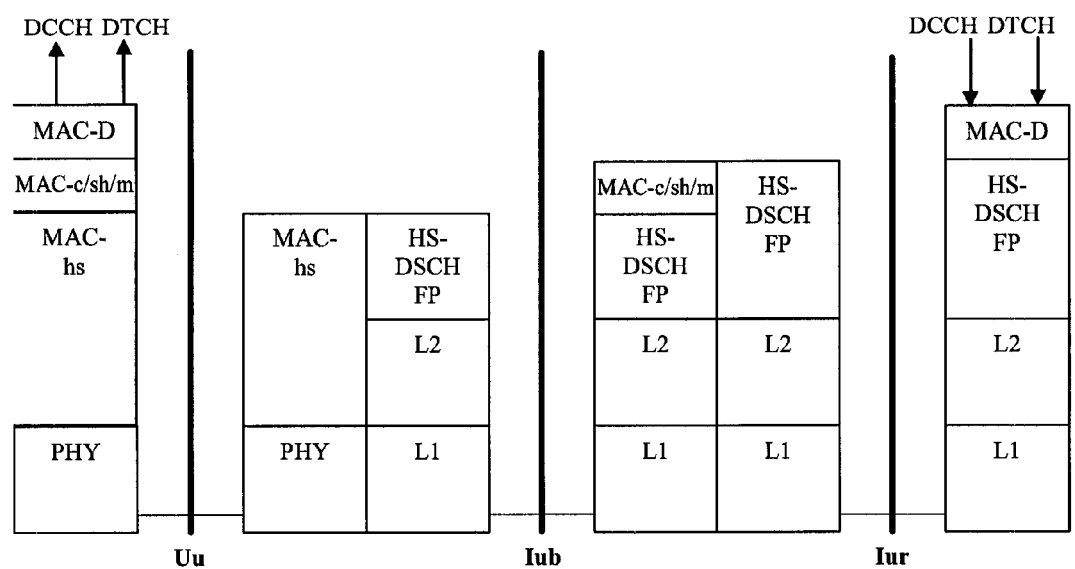
FIG. 4 illustrates a protocol stack of an HS-DSCH according to the related art.
Figure 5:
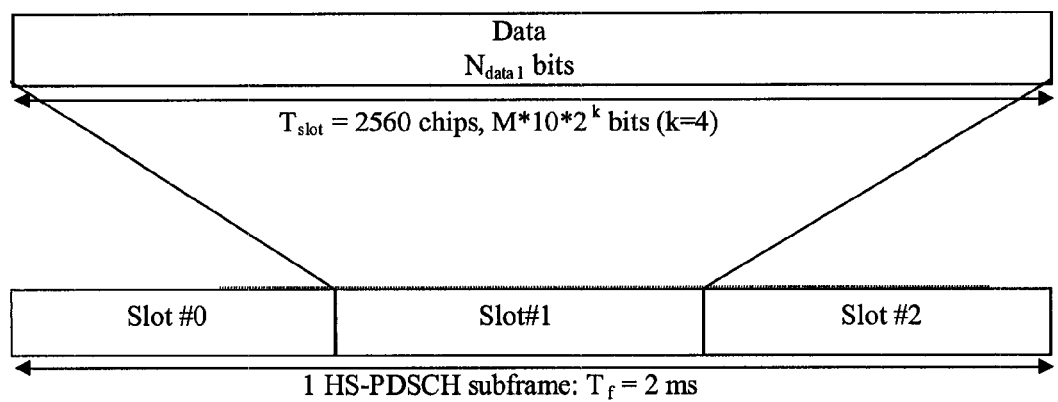
FIG. 5 illustrates a sub-frame and slot structure of the HS-PDSCH.
Figure 6:
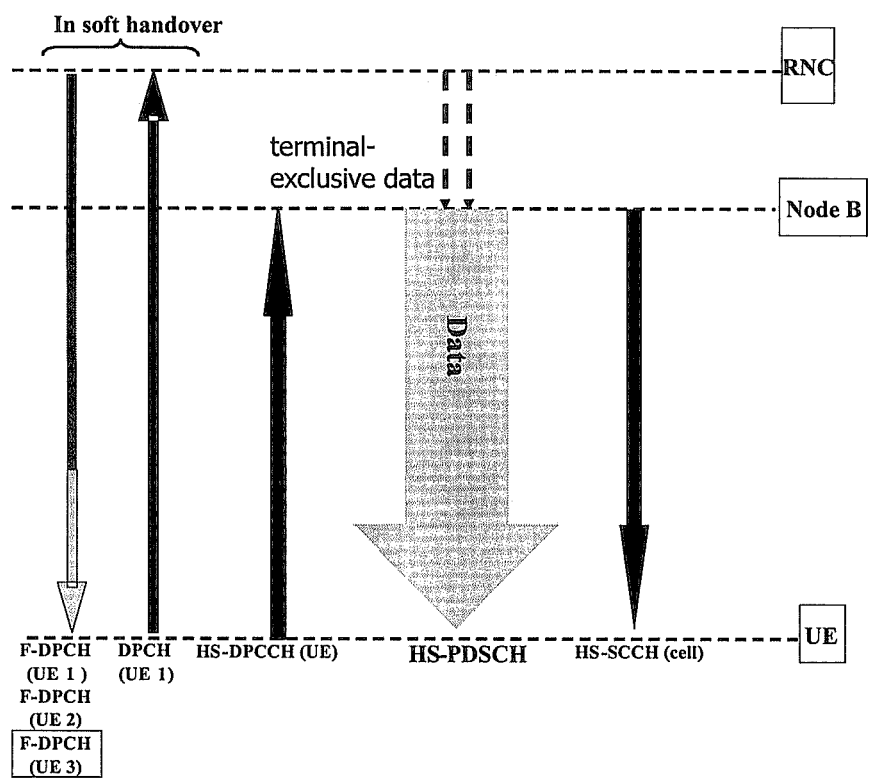
FIG. 6 illustrates a channel configuration according to the related art.
Figure 7:
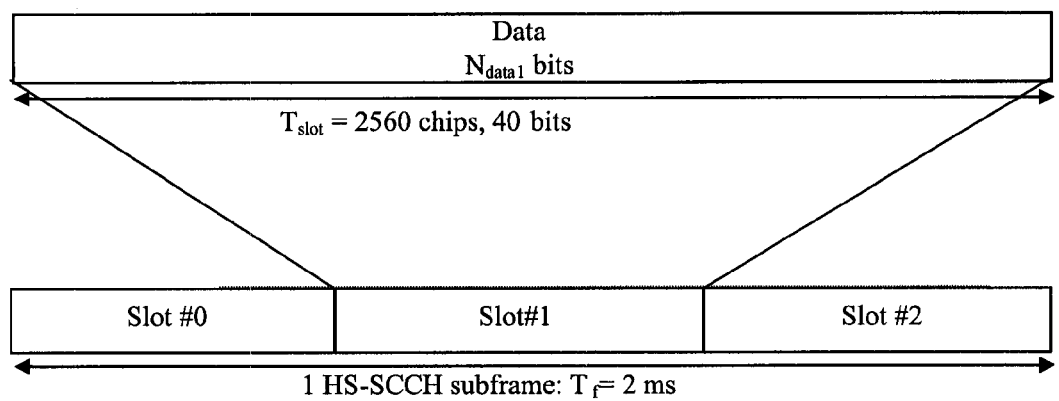
FIG. 7 illustrates a sub-frame structure of an HS-SCCH.
Figure 8:
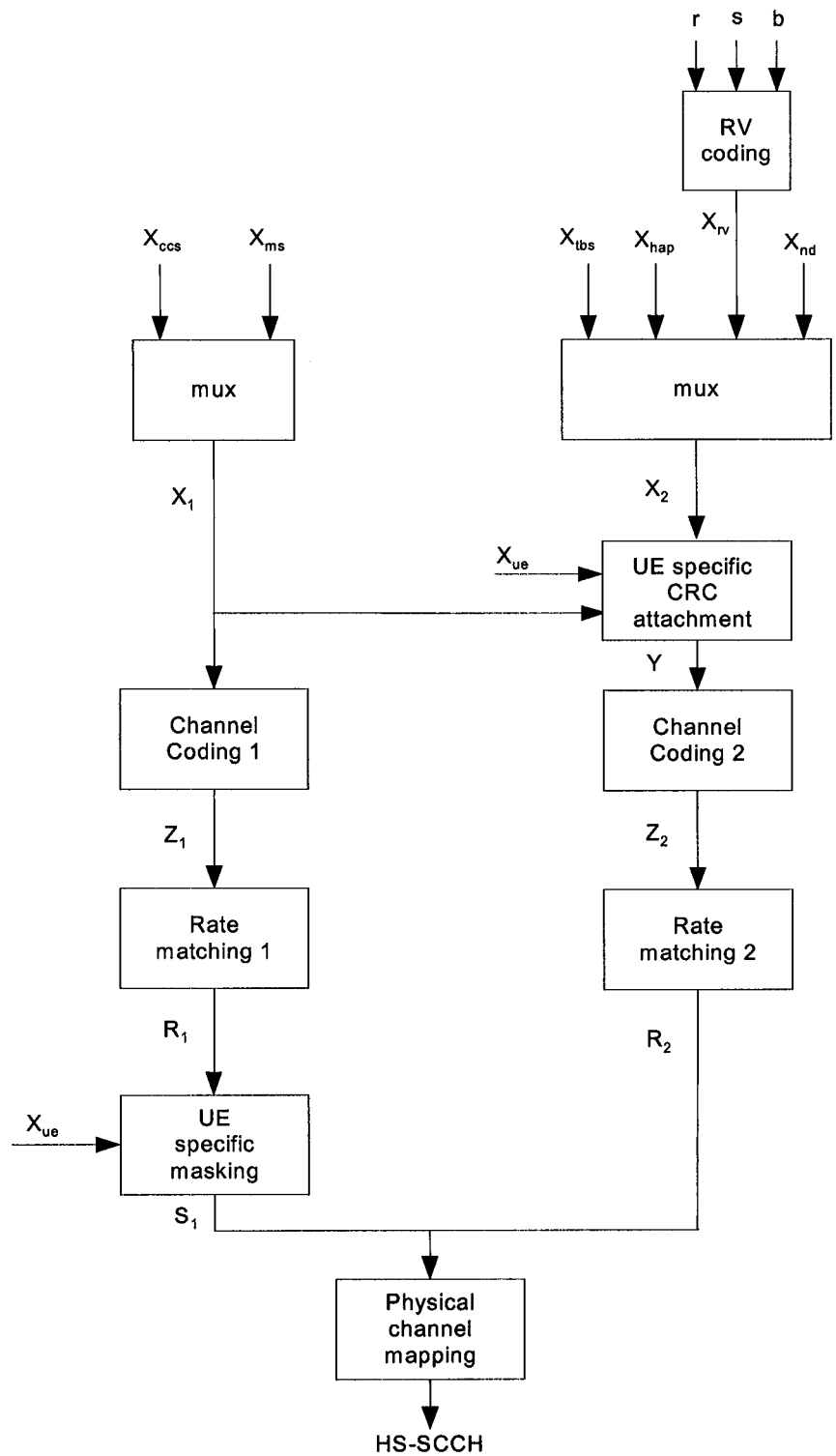
FIG. 8 shows a coding scheme of the HS-SCCH.
Figure 9:
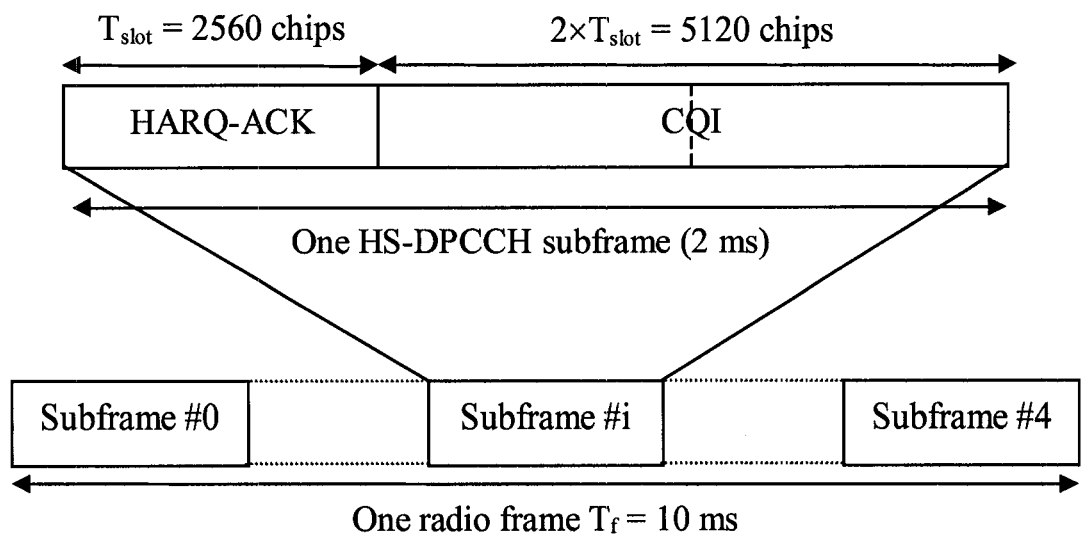
FIG. 9 illustrates a frame structure of an uplink HS-DPCCH.
Figure 10:
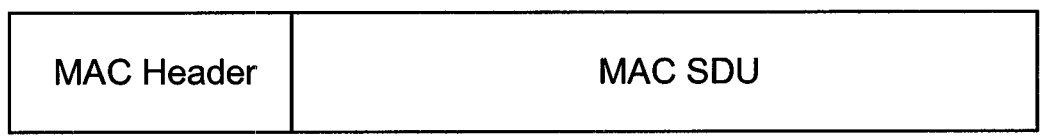
FIG. 10 illustrates a format of a MAC PDU.
Figure 11:
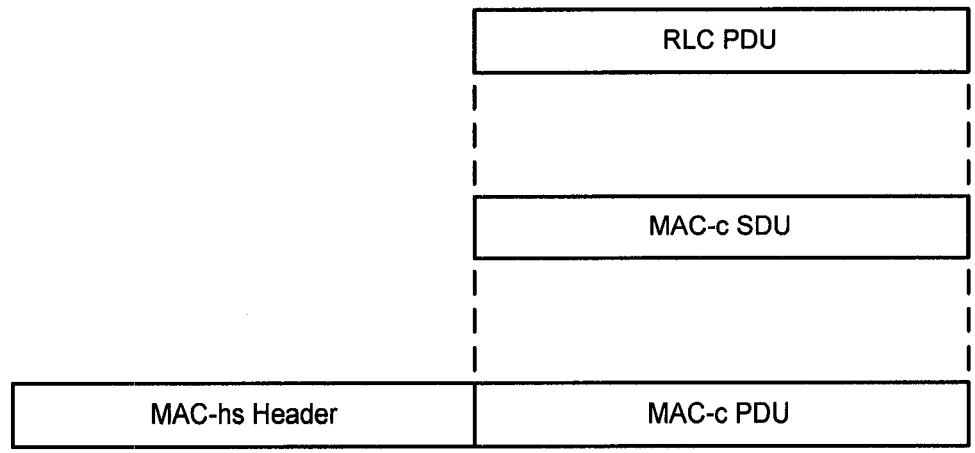
FIG. 11 illustrates a format of a MAC PDU according to a first embodiment of the present invention.

FIG. 11 illustrates a format of a MAC PDU according to a first embodiment of the present invention. In FIG. 11, a MAC-hs header is a type of a MAC header. The MAC-hs header is a MAC entity that handles the HS-DSCH and an MAC-c is an entity that handles a common transport channel.

Figure 12:
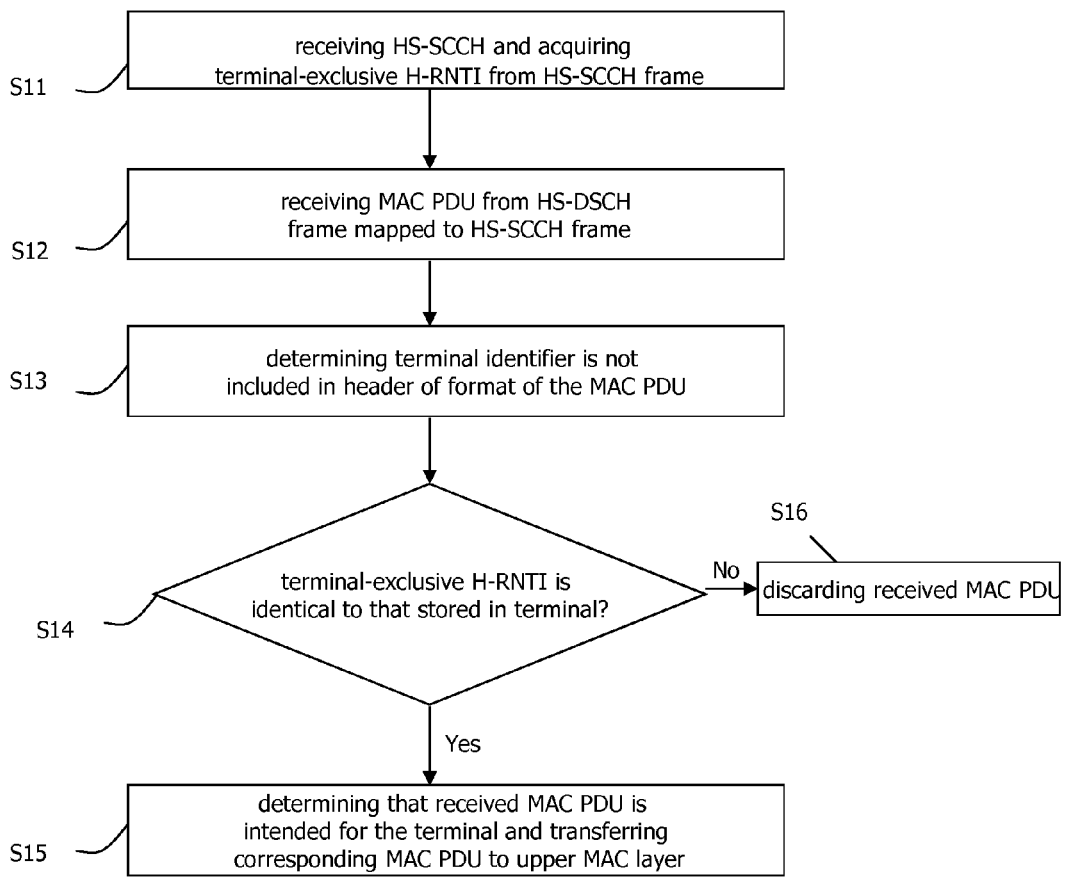
FIG. 12 is a flow chart illustrating an operation of a terminal which has received the MAC PDU in the format as shown in FIG. 11.

FIG. 12 is a flow chart illustrating an operation of a terminal which has received the MAC PDU in such a format as shown in FIG. 11. The present invention will be described with reference to FIGS. 11 and 12. When the terminal receives the HS-SCCH (e.g., a control channel associated with the HS-DSCH) and acquires the terminal-exclusive H-RNTI from the HS-SCCH frame (S11), the terminal receives a MAC PDU in such a format as shown in FIG. 11 from an HS-DSCH frame which is mapped to the HS-SCCH (S12). In this case, the header of the MAC PDU as shown in FIG. 11 does not include a terminal identifier such as a C-RNTI (Cell Radio Network Temporary Identity), a U-RNTI, or an H-RNTI. Thus, the terminal recognizes (determines) that the header of the MAC PDU does not include a terminal identifier (e.g., the C-RNTI, the U-RNTI, or the H-RNTI) (S13). If the terminal-exclusive H-RNTI is identical to a terminal-exclusive H-RNTI stored in the terminal itself (S14), the terminal determines the received MAC PDU as its own and transfers the corresponding MAC PDU to an upper MAC layer (S15). If the terminal-exclusive H-RNTIs are not identical, the terminal discards the received MAC PDU (S16).

In case that the terminal receives the HS-SCCH and acquires a CCCH-exclusive H-RNTI or a general common H-RNTI from the HS-SCCH frame, if the terminal receives a MAC PDU in such a format as shown in FIG. 11 from the HS-DSCH frame that is mapped to the HS-SCCH frame, the terminal determines that a header of the received MAC PDU does not include a terminal identifier. In this case, after receiving the MAC PDU, the terminal transfers the corresponding MAC DPU to an upper MAC layer.

Figure 13:
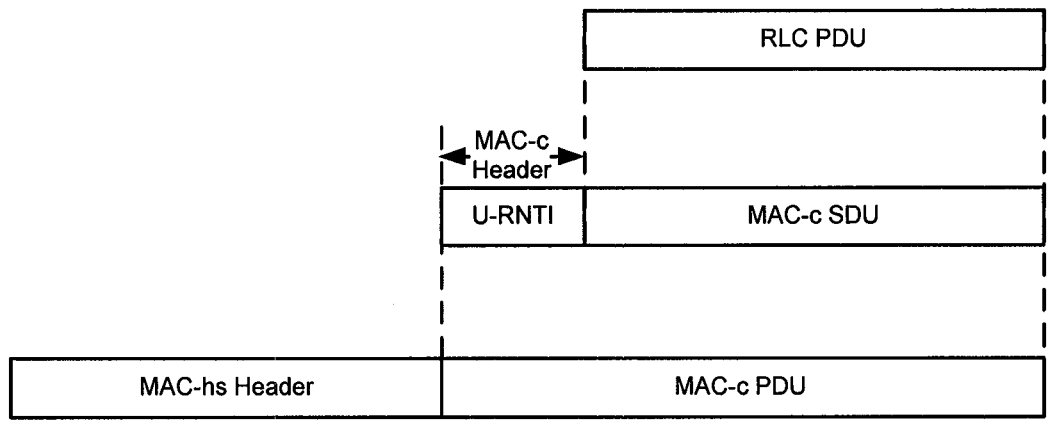
FIG. 13 illustrates a format of a MAC PDU according to a second embodiment of the present invention.

FIG. 13 illustrates a format of a MAC PDU according to a second embodiment of the present invention. In FIG. 13, a MAC-hs header and a MAC-c header are types of MAC headers. The MAC-hs is a MAC entity that handles the HS-DSCH and the MAC-c is a MAC entity that handles the common transport channel.

Figure 14:
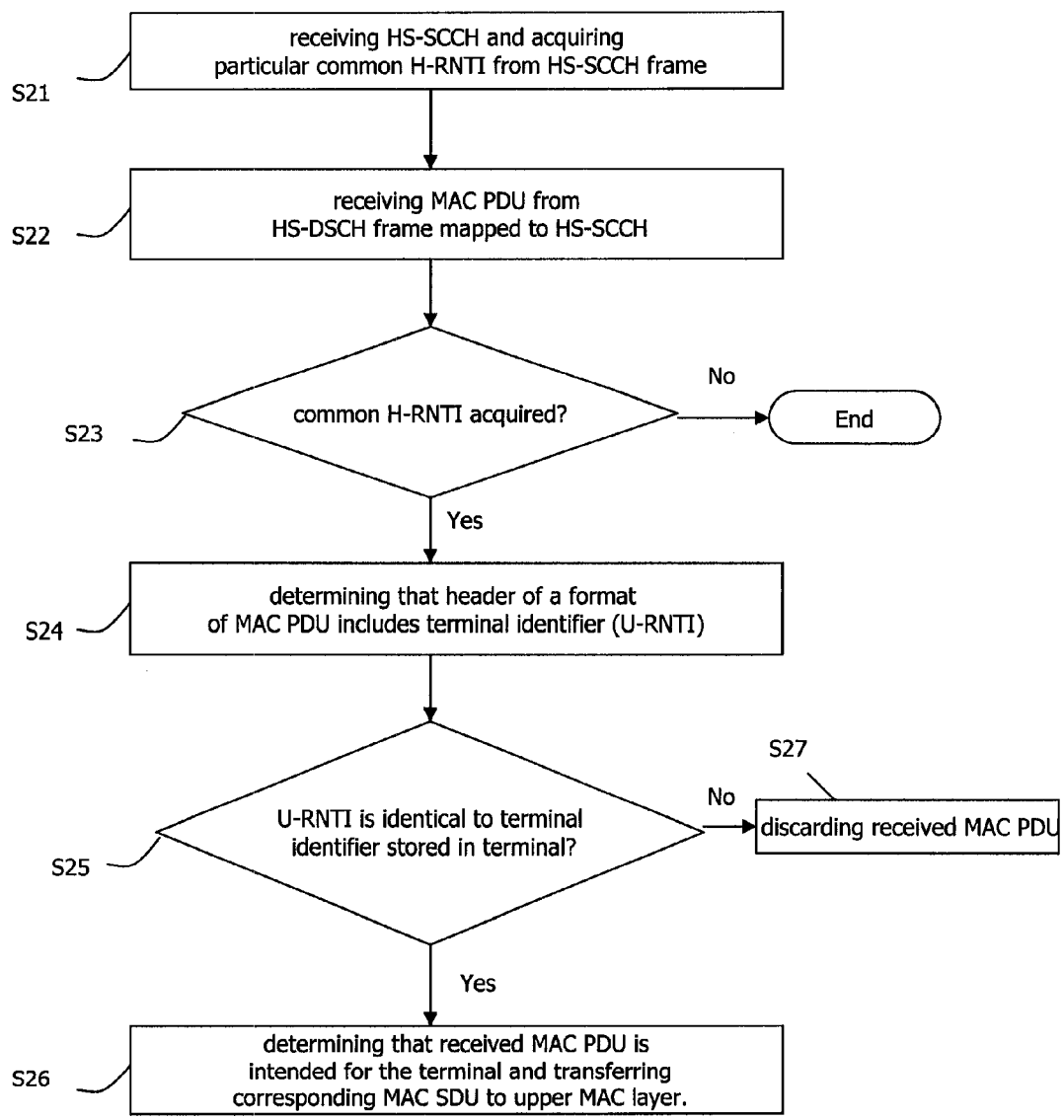
FIG. 14 is a flow chart illustrating an operation of the terminal which has received the MAC PDU in the format as shown in FIG. 13.

FIG. 14 is a flow chart illustrating an operation of the terminal which has received the MAC PDU in such a format as shown in FIG. 13.

If the terminal receives the HS-SCCH and acquires a particular common H-RNTI from the HS-SCCH frame (S21), the terminal determines that a MAC header of a MAC PDU which has been received from an HS-DSCH frame which is mapped to the HS-SCCH includes a terminal identifier (S22 to S24). Here, the terminal identifier included in the MAC header is the U-RNTI as shown in FIG. 13. The particular common H-RNTI, an identifier which is commonly shared and used by a plurality of terminals, serves to inform that the MAC header includes the terminal identifier.

If the terminal identifier (namely, the U-RNTI) included in the MAC header is identical to that stored in the terminal (S25), the terminal determines that the received MAC PDU is intended for the terminal itself and transfers a corresponding MAC SDU to an upper MAC layer (S26). If the terminal identifiers are not identical, the terminal discards the received PDU (S27).

Figure 15:
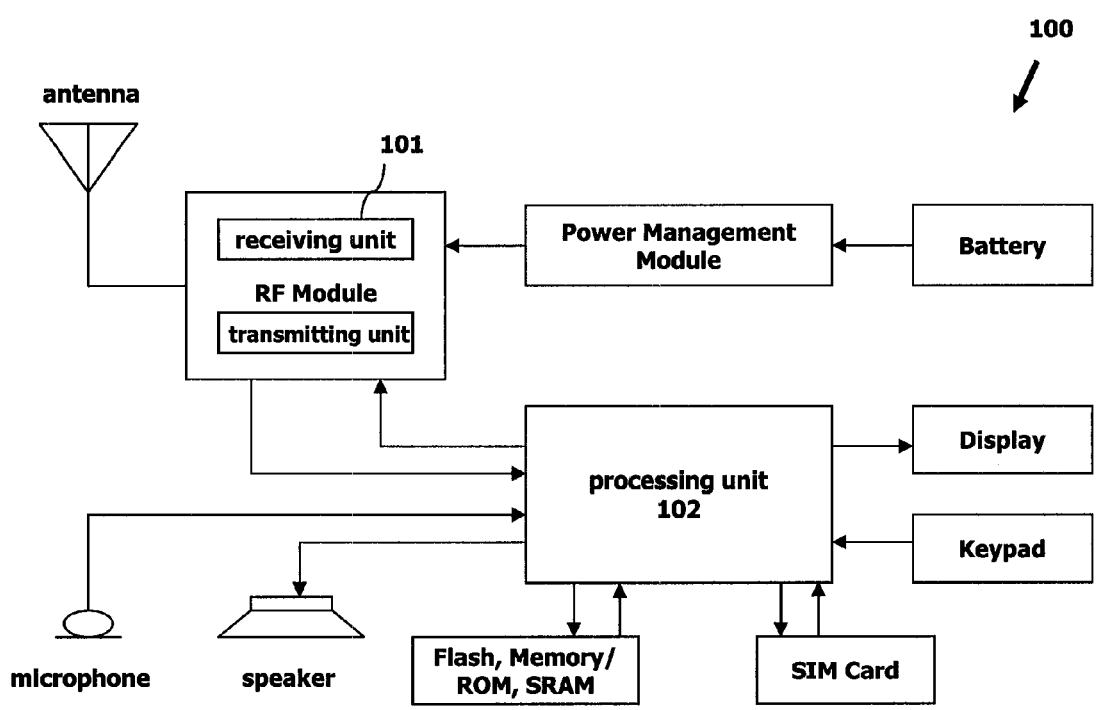
FIG. 15 is a schematic block diagram of the terminal according to an embodiment of the present invention.

FIG. 15 is a schematic block diagram of the terminal according to an embodiment of the present invention.

The configuration and operation of the terminal according to an embodiment of the present invention will now be described with reference to FIG. 15.

The terminal 100 according to an embodiment of the present invention includes any terminal used for mobile communications (e.g., UEs, mobile phones, cellular phones, DMB phones, DVB-H phones, PDA phones, PTT phones, etc), digital TVs, GPS navigation, mobile game devices, MP3s, home appliances, and the like. That is, the mobile terminal 100 comprehensively includes any device to which the technical idea of the present invention can be applicable.

The terminal 100 according to an embodiment of the present invention includes a receiving unit 101 that receives a particular common identifier via the control channel (HS-SCCH) associated with the shared data channel (HS-DSCH) in the radio network (UTRAN); and a processing unit 102 that checks (recognizes or determines) whether a header of a MAC PDU transmitted by the shared data channel includes a terminal-exclusive identifier, acquires a terminal-exclusive identifier from the header of the MAC PDU if terminal-exclusive identifier is included in the header, compares the acquired terminal-exclusive identifier with a terminal-exclusive identifier stored in the terminal itself, and determines that the MAC PDU is intended for terminal itself if the two identifiers are identical, and transfers a corresponding MAC SDU to an upper MAC layer.

If the acquired terminal-exclusive identifier is not identical to the terminal-exclusive identifier stored in the terminal upon comparison, the processing unit 102 discards the received MAC PDU.

The processing unit 102 determines a format of the MAC PDU used for transmission of the HS-DSCH indicated by the HS-SCCH according to the terminal identifier H-RNTI which has been received via the HS-SCCH.

The receiving unit 101 of the terminal 100 receives the HS-SCCH, and the processing unit 102 acquires the terminal identifier H-RNTI from the received HS-SCCH, determines a format of the MAC PDU received via the HS-DSCH according to the acquired H-RNTI, and processes the received MAC PDU according to the determined format of the MAC PDU.

The terminal-exclusive identifier included in the header of the MAC PDU is a U-RNTI that indicates a particular terminal within a single UTRAN. The particular common identifier is an H-RNTI.

The processing unit 102 may be called a controller and the meaning of the name of the processing unit 102 does not limit a function and operation of the configuration. The receiving unit 101 may be called an RF module.

Besides the basic elements as shown in FIG. 15, the terminal 100 according to the embodiment of the present invention includes all the basic elements requisite for the terminal to apply the technique of the present invention. As such, the detailed description of certain elements shown in FIG. 15 and other related elements that can be understood by those skilled in the art are omitted merely for the sake of brevity. The operation and function of each element of the terminal 100 according to the present invention are applied as it is to the corresponding parts of the description with respect to FIGS. 11 to 14.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for receiving data by a terminal in a wireless communication system, the method comprising:
   receiving, by the terminal, a common H-RNTI (HS-DSCH (High Speed Downlink Shared Channel) Radio Network Temporary Identifier) via an HS-SCCH (High Speed Shared Control Channel), wherein the common H-RNTI is commonly used by a plurality of terminals, and wherein the terminal is one of the plurality of terminals;
   receiving, by the terminal, a MAC (Medium Access Control) PDU (Protocol Data Unit) via an HS-DSCH (High Speed Downlink Shared Channel), the HS-DSCH being associated with the HS-SCCH, the MAC PDU including a first header and a MAC SDU (Service Data Unit); and
   transferring the MAC SDU to an upper layer if the terminal is indicated by a U-RNTI (UTRAN Radio Network Temporary Identifier) included in the first header, wherein the first header is a MAC-c (MAC Common) header,
wherein the MAC PDU further includes a second header,
wherein the second header is a MAC-hs header,
wherein the MAC PDU includes the second header, the first header and the MAC SDU in order.

2. A terminal in a wireless communication system, the terminal comprising:
a receiving unit configured to receive a common H-RNTI (HS-DSCH (High Speed Downlink Shared Channel) Radio Network Temporary Identifier) via an HS-SCCH (High Speed Shared Control Channel), and to receive a MAC (Medium Access Control) PDU (Protocol Data Unit) via an HS-DSCH (High Speed Downlink Shared Channel), the HS-DSCH being associated with the HS-SCCH, and the MAC PDU including a first header and a MAC SDU (Service Data Unit), wherein the common H-RNTI is commonly used by a plurality of terminals, and wherein the terminal is one of the plurality of terminals; and
a processing unit configured to transfer the MAC SDU to an upper layer if the terminal is indicated by a U-RNTI (UTRAN Radio Network Temporary Identifier) included in the first header,
wherein the first header is a MAC-c (MAC Common) header,
wherein the MAC PDU further includes a second header, and
wherein the second header is a MAC-hs header,
wherein the MAC PDU includes the second header, the first header and the MAC SDU in order.

3. A method for transmitting data by a network to a terminal in a wireless communication system, the method comprising:
transmitting a common H-RNTI (HS-DSCH (High Speed Downlink Shared Channel) Radio Network Temporary Identifier) to the terminal via an HS-SCCH (High Speed Shared Control Channel), wherein the common H-RNTI is commonly used by a plurality of terminals, and wherein the terminal is one of the plurality of terminals;
generating a MAC (Medium Access Control) PDU (Protocol Data Unit) including a first header and a MAC SDU (Service Data Unit); and
transmitting the generated MAC PDU to the terminal via an HS-DSCH, the HS-DSCH being associated with the HS-SCCH,
wherein the first header includes a U-RNTI (UTRAN Radio Network Temporary Identifier) for indicating the terminal,
wherein the first header is a MAC-c (MAC Common) header,
wherein the MAC PDU further includes a second header, and
wherein the second header is a MAC-hs header,
wherein the MAC PDU is generated to include the second header, the first header and the MAC SDU in order.

* * * * *